O. C. HOUGHTON.
TRACTION ENGINE.
APPLICATION FILED SEPT. 26, 1914.

1,183,381.

Patented May 16, 1916.
10 SHEETS—SHEET 1.

FIG. 1.

WITNESSES:
W. N. Smith.
N. P. Karll

INVENTOR:
ORLEY C. HOUGHTON,
BY Michael J. Stark & Sons
ATTORNEYS.

O. C. HOUGHTON.
TRACTION ENGINE.
APPLICATION FILED SEPT. 26, 1914.

1,183,381.

Patented May 16, 1916.
10 SHEETS—SHEET 10.

WITNESSES:

INVENTOR:
ORLEY C. HOUGHTON,
BY
ATTORNEYS.

UNITED STATES PATENT OFFICE.

ORLEY C. HOUGHTON, OF CHICAGO, ILLINOIS, ASSIGNOR TO BULLOCK TRACTOR CO., OF CHICAGO, ILLINOIS, A CORPORATION OF ILLINOIS.

TRACTION-ENGINE.

1,183,381.   Specification of Letters Patent.   Patented May 16, 1916.

Application filed September 26, 1914. Serial No. 863,724.

*To all whom it may concern:*

Be it known that I, ORLEY C. HOUGHTON, a citizen of the United States, and resident of Chicago, in the county of Cook and State of Illinois, have invented certain new and useful Improvements in Traction-Engines; and I do hereby declare that the following description of my said invention, taken in connection with the accompanying ten sheets of drawings, forms a full, clear, and exact specification, which will enable others skilled in the art to which my said invention appertains to make and use the same.

This invention has general reference to traction engines, and especially that class of tractors having endless, self-laying, tracks, on which the machine is constructed to move. This class of traction engines is generally steered by one or more steering wheels located at the forward end of the machine; or by varying the speed of the endless tracks, of which there are usually two, *i. e.*, one on each side of the machine; and also by steering wheels combined with the variant movements of said tracks. It is this latter type of traction engines with which my present invention is especially concerned; and it consists, essentially, in the novel and peculiar combination of parts, and details of construction, as hereinafter first fully set forth and described, and then pointed out in the claims.

In the drawings already mentioned, which serve to illustrate the preferred embodiment of my said invention, Fig. 9 is a sectional view on an enlarged scale of a portion of the steering mechanism, the section being on line 9—9 of Fig. 4. Fig. 10 is a side-elevation, and Fig. 11 is a plan of the pivot-bracket for the steering wheels yoke. Fig. 12 is a plan, Fig. 13 is an end view, Fig. 15 is a sectional view.

Like parts are designated by the same symbols and characters of reference in all the figures.

20, 20$^a$ in the drawings designates the chassis or main frame member of this machine. It is preferably an I-beam of sufficient depth to carry the superposed load, said I-beam being bent at its forward end so as to resemble the letter U, this portion of the beam being desingated by the reference-numeral 21. The rear terminals of this I-beam 20 are connected by a channel or angle bar 22, and by a floor or platform 23, upon which the operator of the machine takes his position, there being an upwardly and rearwardly extending support 24 mounted on the platform 23, which support carries a seat 25, for the said operator.

Adjacent to the platform 23 there is located upon the chassis, a motor, A, preferably of the internal combustion type of engines, which motor is supplied with liquid fuel from an overhead tank B, and cooled by a cooler or condenser, C, of usual and approved design.

Figure 2:
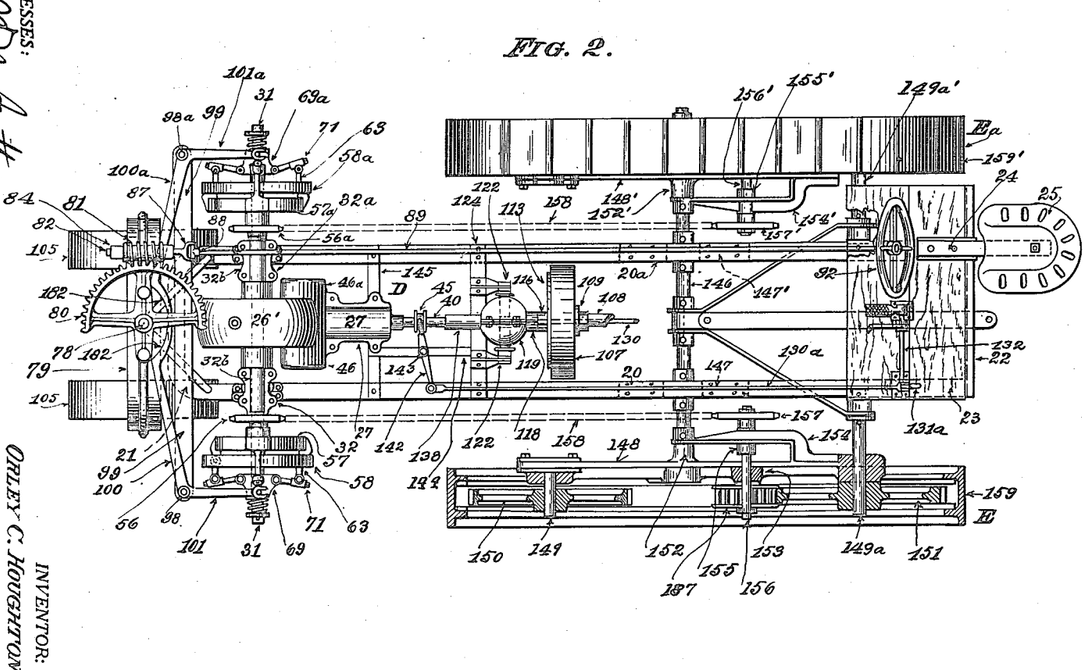
Fig. 2 is a plan of the same, partly in section, the motor being omitted to disclose underlying parts and other minor details not involved in this application being omitted.

Near the forward end of the chassis there is located the transmission D, by which motion is communicated from the motor A to a pair of trucks E, E$^a$, located one on each side of the machine at the rear end thereof. Transmission D includes a gear case 26, 26', having a rearwardly extending bearing 27, in which there is located a clutch, to be hereinafter more fully described. In the main portion 26, 26', of this gear case there is located a pair of oppositely facing bevel gear wheels, 29, 29$^a$, the latter of which has, concentric to the outer circle of cogs, a further, smaller circle of cogs, 30, said bevel gear wheels 29, 29$^a$, being loosely mounted on a transverse shaft, 31, having bearings 32, 32$^a$, formed preferably integrally with the main portion 26 of said gear case, caps, 326, being located on these bearings, as shown in Fig. 2.

Figures 4, 5, 6, 7, 8:
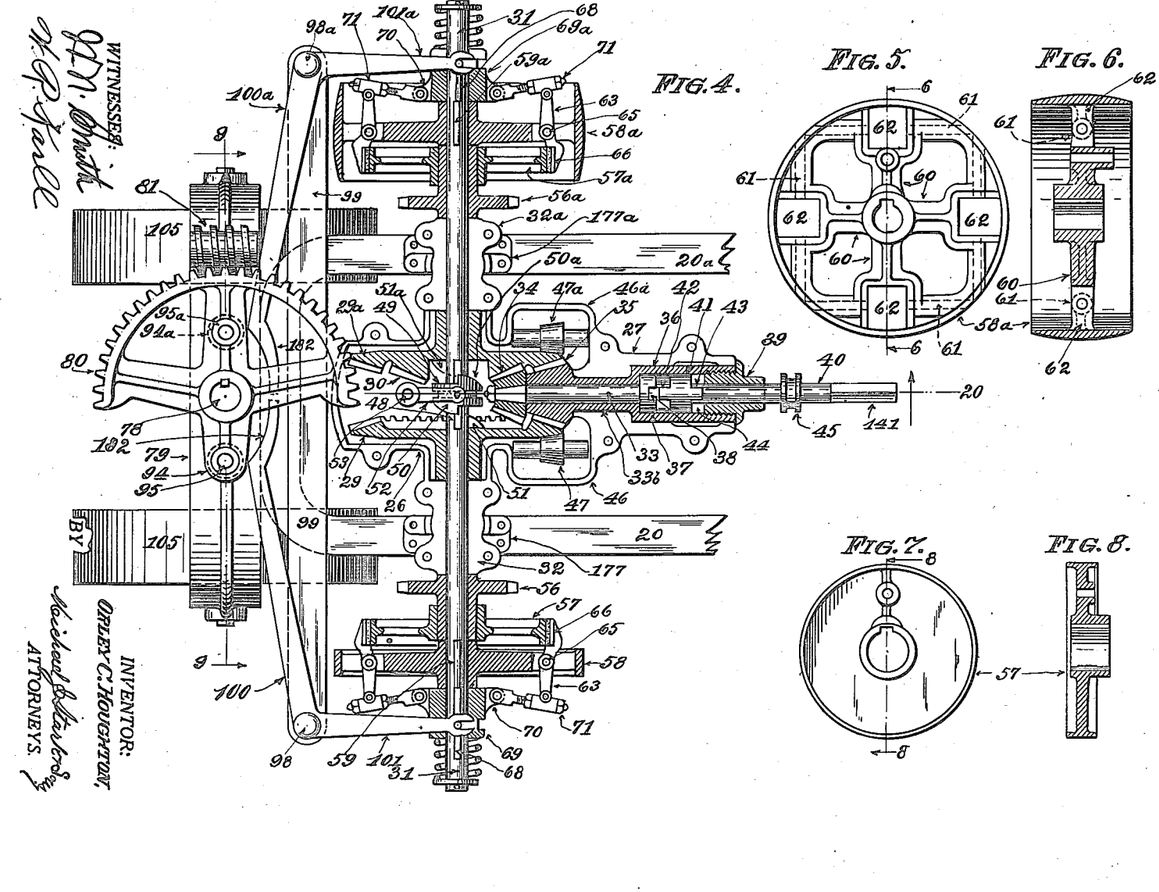
Fig. 4 is a plan of the forward portion of this machine, the transmission gearing employed being in section, the sectional portion being on line 4—4 of Fig. 20.
Fig. 5 is an elevation of the friction clutch member by which power is transmitted from the motor to the traction bands.
Fig. 6 is a sectional view of the same, on line 6—6 of Fig. 5.
Fig. 7 is an elevation of the friction driven member of said friction clutch.
Fig. 8 is a sectional view of the same on line 8—8 of Fig. 7.
Figures 20, 21, 22, 23:
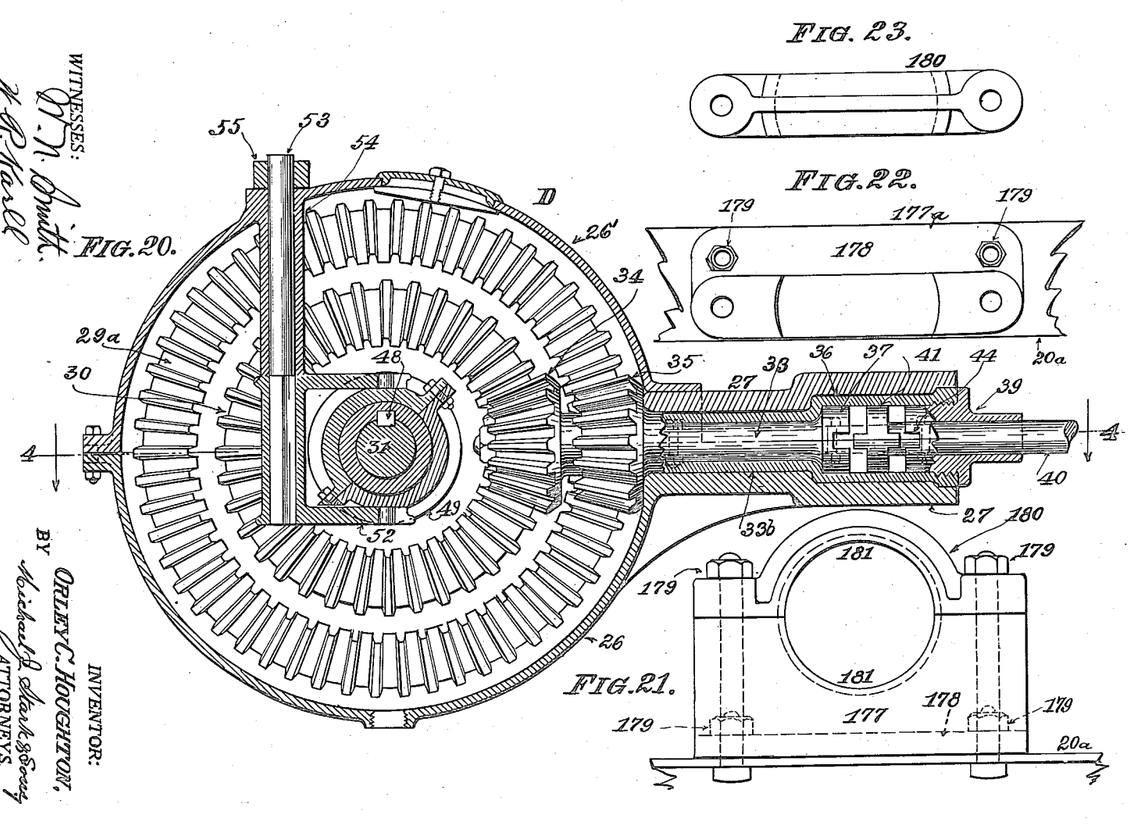
Fig. 20 is a sectional elevation on an increased scale on line 20, of Fig. 4, of a part of the transmission gearing.
Fig. 21 is a side-elevation of one of the pillow blocks in which the gear is mounted.
Fig. 22 is a plan of the box thereof.
Fig. 23 is a plan of the cap for said box.

Longitudinally of the chassis, and entirely within the main portion of the gear case there is a shaft, 33, Figs. 4 and 20, at the forward extremity of which there is secured a bevel pinion, 34, meshing with the inner circle of cogs 30. This shaft 33 rotates freely in a tubular member 336, having at its forward end a bevel pinion 35, coacting with the larger circles of cogs 29, 29$^a$, of said bevel wheels, and at its rear end an enlarged, cylindrical portion 36.

At the rear end of shaft 33 there is a collar 37, having in its rear face a transverse groove, or clutch jaw 38. The cylindrical portion 36 is internally screw-threaded at its rear end to receive an axially bored cap 39, through the bore of which passes a stub-shaft 40, having at its forward extremity a head 41, said head having at its forward flank a transverse projection or clutch jaw 42, constructed to engage the transverse groove 38, and at its rear flank similar projections 43, constructed to engage coacting transverse grooves or clutch jaws 44, formed on the inner face of the cap 39. This shaft 40 carries a shifter collar 45, Figs. 2 and 4, by means of which, and suitable mechanism, hereinafter to be described, said shaft 40 may be laterally moved to cause either the projection 42 to engage the groove 38, or the projections 43 to engage the groove 44, according to which direction said shaft 40 is moved.

The main portion of the gear case has two sidewise projecting portions 46, 46$^a$, in which are located bearing rollers, 47, 47$^a$, constructed to bear against the rear flanks of the bevel gear wheels to counteract the thrust exerted on the two bevel wheels 29, 29$^a$, when being rotated by the bevel pinions 34 and 35.

Medially, the transverse shaft 31 has a spline 48, and on the shaft there is a sidewise movable clutch member 49, having jaws 50, 50$^a$ constructed to engage similar jaws 51, formed on the face of bevel gear wheel 29, or jaws 51$^a$ formed on the bevel gear wheel 29$^a$, a forked lever 52, Figs. 4 and 20, being provided which lever is secured to the lower end of a vertically disposed shaft 53, Fig. 20, journaled in a downwardly extending tubular bearing 54 in gear-case cover 26', a lever 55, being secured to the outer extremity of said vertical shaft 53, to move said clutch-member 49, said lever 55 being connected to a hand lever 106, located on the rear platform as will hereinafter appear.

Figure 3:
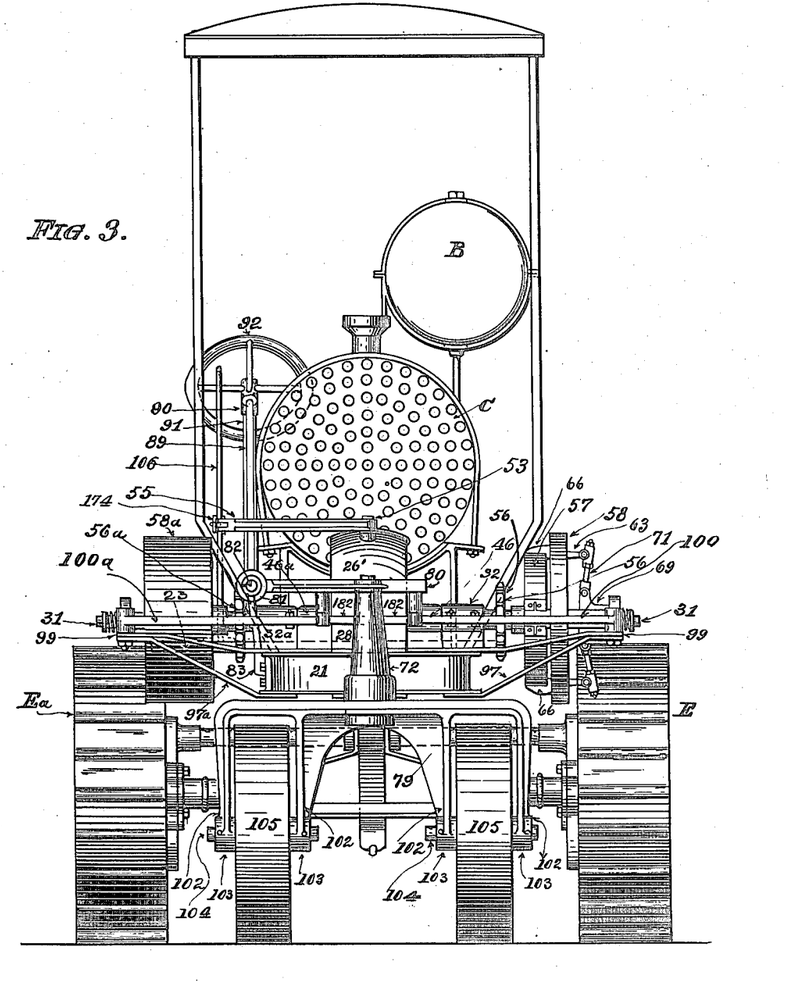
Fig. 3 is a front-elevation of said machine.
Figure 12:
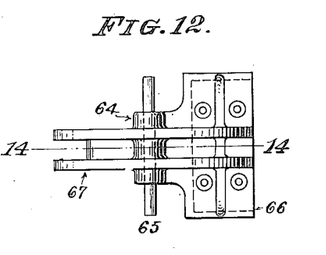
Figure 13:
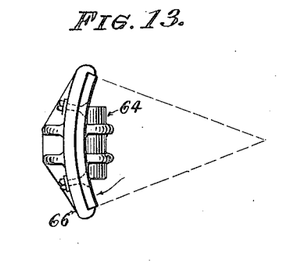
Figure 14:
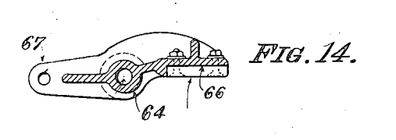
Fig. 14 is a sectional view on line 14—14 of Fig. 12 of one of the friction shoes detached.

Movement is transmitted to the endless track bands of the trucks E, E$^a$, by the following mechanism: Loosely mounted on the transverse shaft 31, at some distance from its extremities there are located sprocket wheels 56, 56$^a$, having comparatively long hubs on which are secured driven disks 57, 57$^a$; and at the outer flanks of these disks are located on said shaft 31, driver disks or spiders 58, 58$^a$, which are keyed to shaft 31, by keys 59, 59$^a$. These spiders, as shown in detail in Figs. 5 and 6 have four, (more or less) forked arms, 60; and at right angles thereto tubular bearings, 61. In the spaces 62 of the forked arms there are pivoted levers 63, Figs. 3 and 4, shown in detail in Figs. 12, 13 and 14, said levers comprising each, a tubular member 64, through which a shaft 65, is passed that is journaled in two of the oppositely located tubular bearings 61. Adjacent to the tubular member 64 there is a curved plate 66, the curvature of which corresponds to the peripheral curvature of the driven disk 57; and projecting from said boss or tubular member 64, in direction opposed to that of the plate 66, are, preferably, two, arms 67, to be further on again referred to.

Figure 15:
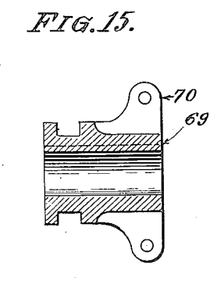
Figure 16:
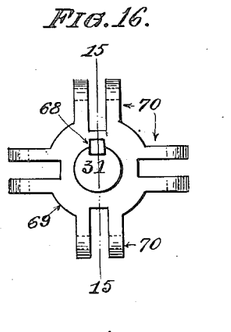
Fig. 16 is an end-elevation of the clutch collar, Fig. 15 being drawn on line 15—15 of Fig. 16.

On the transverse shaft 31 adjacent to the driving disks or spiders 58, 58$^a$, are splined, (by splines 68,) clutch collars, 69, 69$^a$, shown in detail in Figs. 15 and 16.

These clutch collars have radially extending forks 70, corresponding, in number, to that of the forked arms in the driven disks 58, 58ª, in which forks are pivoted thrust-links 71, Fig. 4, that connect said clutch collars 69, 69ª, to the arms 67 of the brake-shoes or members 63.

Figures 9, 10, 11:
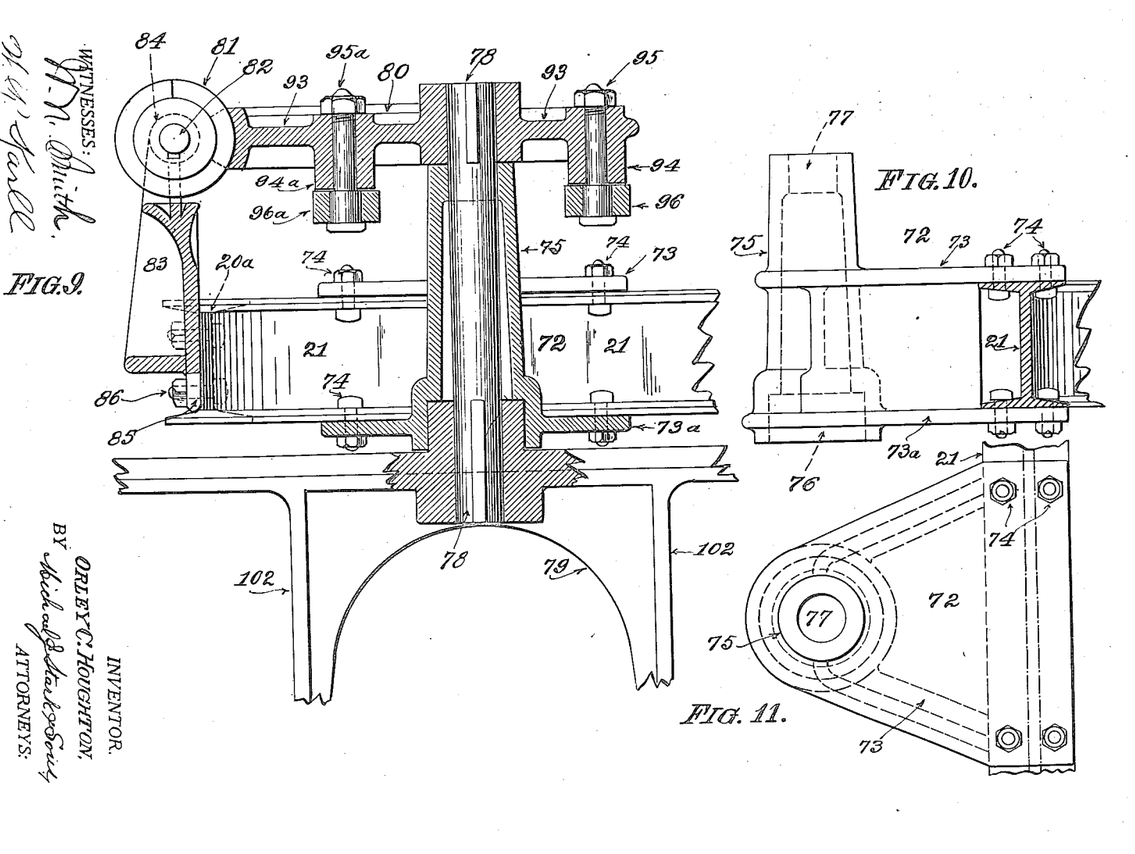
Figure 17:
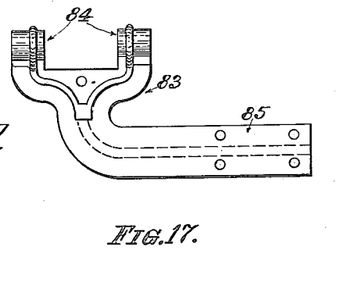
Fig. 17 is a side-elevation of the bearing-bracket in which the worm is journaled.
Figure 18:
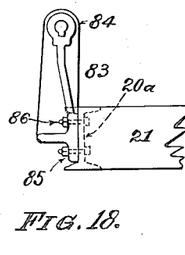
Fig. 18 is an end-elevation of the same.
Figure 19:
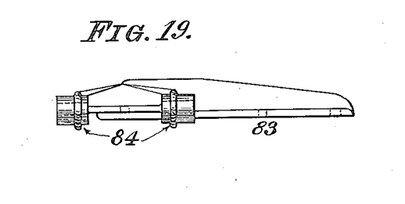
Fig. 19 is a plan thereof.

In front of the forward portion 21 of the chassis or I-beam 20, there is located a bracket 72, shown in detail in Figs. 9, 10, and 11. This bracket has top and bottom flanges 73, 73ª, by which, and bolts 74, said bracket is secured to the top and bottom flanges of the I-beam portion 21. Forward of these flanges there is an upstanding tubular bearing 75, having its bore 77, enlarged at its lower end as indicated at 76, Fig. 10. In this bore there is journaled a vertical shaft 78, the lower end of which is keyed to a yoke 79, while to the upper end of said shaft there is keyed a semicircular sector of a worm wheel 80, wherewith engages a worm 81, mounted on a horizontally disposed short shaft 82, journaled in bearings 84 formed on a bracket 83, shown in detail in Figs. 17, 18 and 19. This bracket has a horizontally disposed plate 85, by means of which, and bolts 86, Fig. 9, said worm-supporting bracket is secured to the member 20ª, of the chassis. The rear end of this shaft 82 terminates in a fork 87, Fig. 2, which connects with a knuckle 88, provided at the forward end of steering rod 89, extending rearwardly to near the operator's seat 25, where it has a bearing 90, Fig. 1, at the upper end of a column 91 located on the platform 23, and a handwheel 92 by which the rod 89 and worm 81 are rotated. The fork 87 and knuckle 88 already mentioned, serve as a universal coupling in an obvious manner.

From the spokes 93, of the worm-wheel 80 project downwardly, and at diametrically opposite points, tubular bosses 94, 94ª, Fig. 9, wherein are secured stud-bolts 95, 95ª, carrying at their lower ends anti-friction rollers 96, 96ª.

At the forward end of the machine and projecting from each side of the chassis there are brace-bars 97 and 97ª, best seen in Fig. 3, the outer extremities of which meet in stud-bolts 98, 98ª, Fig. 4, while a transverse bar 99, connects with these brace-bars at these stud bolts and thus forms a frame structure at the extremities of which, and upon said stud-bolts 98, 98ª, there are pivoted bell-crank levers 100, 100ª, the short arms 101, 101ª, of which connect with the clutch-collars 69, 69ª, while the long arms thereof reach to near the pivotal point of the segmental worm wheel. At these extremities the long arms are curved, as indicated at 182, Fig. 4, the points of divergence of the curved and straight portions of said long arms being approximately in line with the centers of the antifriction rollers 96, 96ª.

As hereinbefore stated the lower end of the upstanding shaft 78 is keyed to the yoke 79. This yoke, as best shown in Fig. 3 has four downwardly extending members, 102, the lower ends of which afford bearings, 103, for shafts or axles 104 on which are mounted steering wheels 105.

Figures 24, 26:
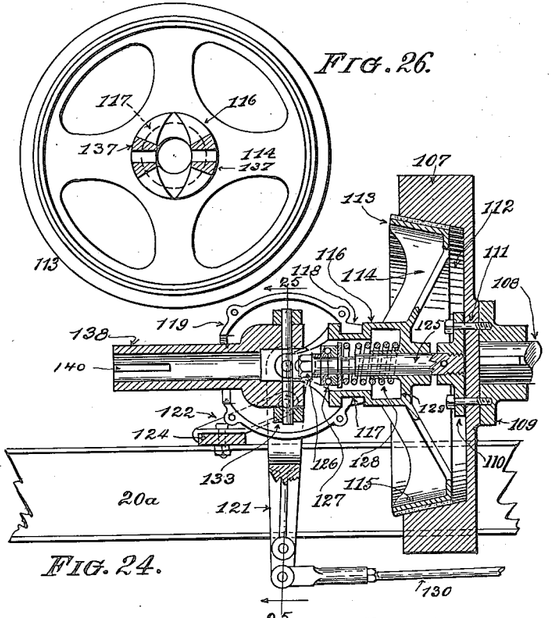
Fig. 24 is a sectional view of a portion of the motor and the clutch mechanism that connects the motor to the transmission gearing, the section being on line 24—24 of Fig. 25.
Fig. 26 is a front view, and Fig. 27, a rear view of the friction member connected with the fly-wheel of the motor.

The motor A is indirectly connected to the transmission D, in the following manner. The fly-wheel 107 of the motor A is connected to the crank shaft 108, Fig. 24, of the same, by a keyed-on coupling flange 109, together with a flange 110, by a sufficiency of bolts 111. The rim of this fly-wheel is tapering bored at 112, to receive a friction disk 113, the spokes 114 of which, connect the tapering rim 115, with a long, tubular boss 116, in which there is an annular circumferential groove 117. This groove 117 is engaged by the annular member 118, of a globular casing 119, made in two halves to permit its being placed over the mechanism contained therein, said globular casing having trunnions 120, Fig. 25, by which it may be horizontally moved in connection with a forked lever 121, which lever is fulcrumed in two bearings 122 by pivots 123. These bearings are secured to a cross-bar 124, connected to the chassis-members 20, 20ª.

In the flange 110, and axially in alinement with the crank-shaft 108, there is a stud-shaft 125, on which the friction disk 113 is constructed to rotate. This stud-shaft has at its forward end a lock-nut 126, and back of this nut a ball-bearing 127; a spiral spring 128, being interposed between this ball-bearing and the inner wall 129 of the hub 116 to force the friction disk 113 with its tapering rim 115 into the tapering bore 112 of the fly-wheel 107, and thereby make driving contact therewith.

Figure 1:
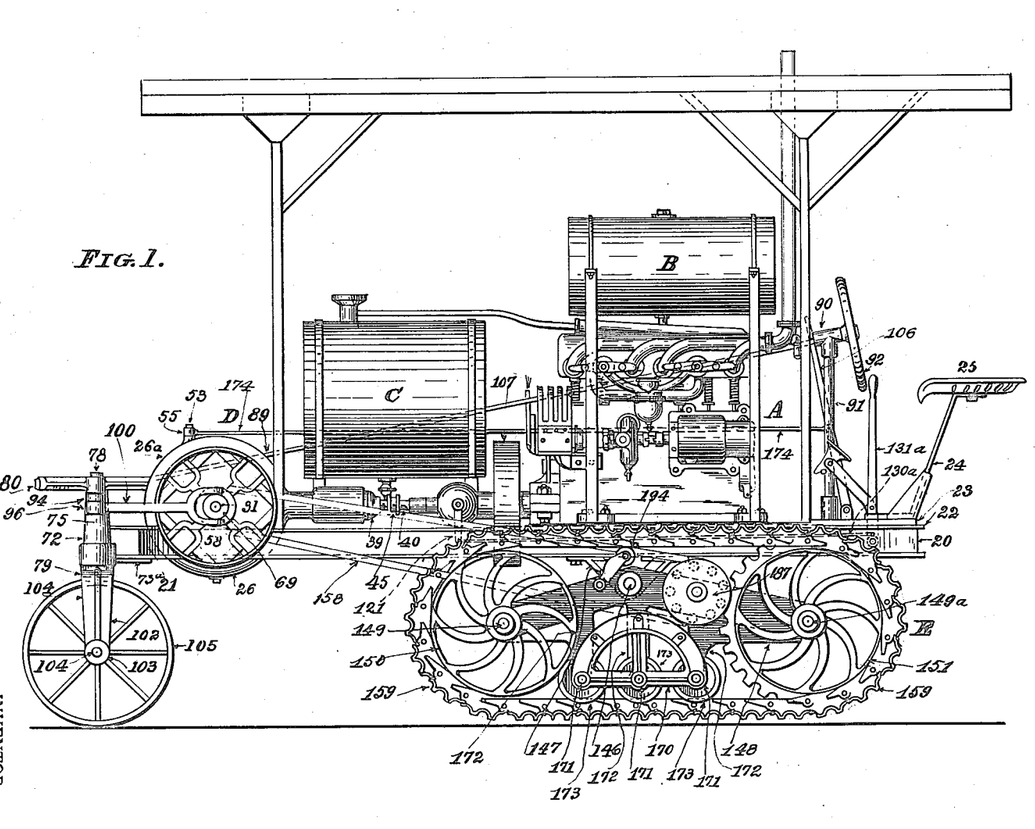
Figure 1 is a side-elevation of my improved tractor, minor details shown in detail in other figures being omitted.

The forked lever 121 is actuated by a rod 130 connected to the terminal of said forked lever at one end, and to an upstanding hand-lever 131ª, Figs. 1 and 2, at the other end, said upstanding hand-lever being secured to a shaft 132, Fig. 2, mounted in suitable bearings located upon the rear platform 23, to be within easy reach of the operator seated on the seat 25.

Figures 25, 30, 31, 32:
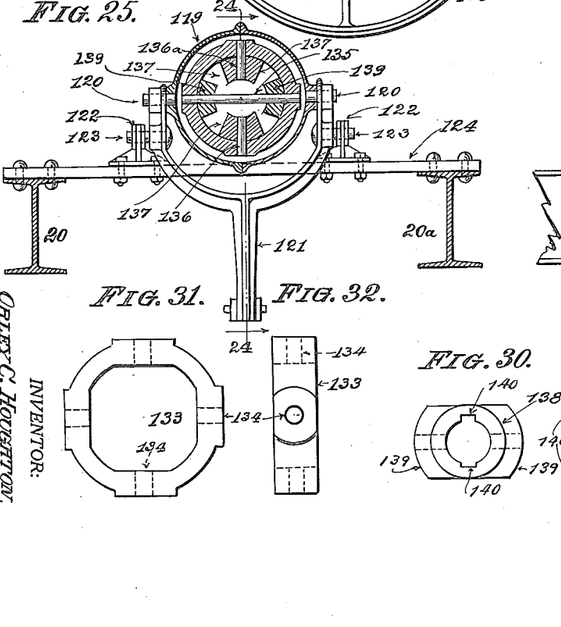
Fig. 25 is a transverse sectional elevation of the same on line 25—25 of Fig. 24.
Figs. 28, 29 and 30 are detail views of a tubular sleeve being part of the driving mechanism of this tractor.
Figs. 31 and 32 are detail views of a member of the gimbal joint connected with the driving mechanism.
Figure 27:
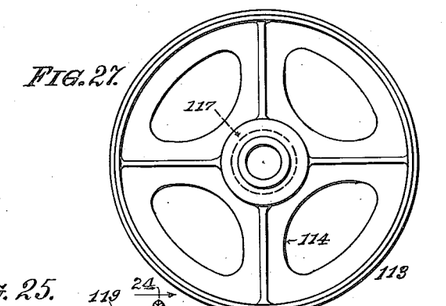
Figure 28:
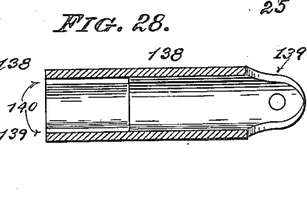
Figure 29:
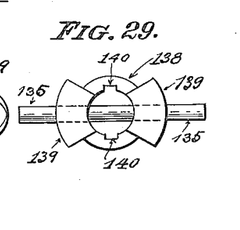

In the globular casing 119 there is provided a gimbal-joint mechanism including an annular ring 133, having at diametrically opposing points holes, 134, as shown in Figs. 31 and 32, in which there is located a single pin 135, Figs. 25 and 29, and two shorter pins 136, 136ª. In the forward face of the hub 116, there are formed two knuckles 137, Figs. 25 and 26, bored to receive the short pin 136 and 136ª, while, in axial alinement with the stud-shaft 125, there is a tubular member or sleeve 138, shown in detail in Figs. 28, 29, and 30. This tubular sleeve has at its rear extremity two knuckles, 139, bored to receive the long pin 135, thereby connecting the disk 115, to the tubular sleeve 138 by said gimbal-joint connection.

The tendency of the spiral spring 128 is to keep the friction disk in operative engagement with the fly-wheel of the motor. By moving the hand-lever 131$^a$ in the proper direction, the globular casing with its contained mechanism is forwardly moved, and thereby the engagement of the friction disk and the fly-wheel broken, or in other words the motor A is permitted to operate without operating the transmission gearing.

The tubular sleeve 138 is provided with either key-ways 140, as shown in Figs. 24, 28, 29, and 30, or constructed to receive the squared end 141, of the shaft 40, shown in Fig. 4, to permit of the endwise movement of the tubular sleeve 138, and of the shaft 40 independently of each other. In order to move this latter shaft 40 to change the speed of the tractor from normal to slow speed, there is fixed on said shaft 40 the clutch sleeve 45 already mentioned. This clutch sleeve is moved by means of a lever 142, Fig. 2, pivoted to a stud 143 secured to a longitudinal bar 144 connected at one end to the cross-bar 124 and at its other end to a cross-bar 145. The long arm of this lever 142 connects by a rod 130$^a$, to a hand-lever 131$^a$, located at the rear end of the machine.

The trucks E, E$^a$, are alike in construction so that a detailed description of one applies with equal force to the other, like reference characters being employed to designate the various parts except that a prime (') is added to distinguish one, from the other set of parts.

Near the rear end of the chassis there is located a transverse non-rotatable, axle 146, supported in brackets 147 depending from the members 20, 20$^a$, of the chassis and extending outwardly at both sides beyond the chassis. Pivoted at the outward extremity of axle 146 there is a substantially triangular truck-frame 148, shown in detail in Figs. 36 to 40 inclusive, at the terminals of which are provided bearings 184, 184$^a$, wherein are mounted shafts 149, 149$^a$, on the former shaft there being located an idler wheel 150, and on the latter shaft being mounted a driving sprocket wheel 151. In the triangular frame 148, and adjacent to the central hub 152 thereof, there is a bearing 153; and at the inner faces of the truck frames there is a bracket 154 having a bearing 155 in alinement with the bearing 153, to receive shaft 156, on the outer extremity of which there is secured a lantern pinion 187 that engages the teeth of the sprocket wheel 151 to rotate the same.

At the inner end of shaft 156 there is secured a sprocket wheel 157, which sprocket wheel connects with the sprocket wheel 56, while the sprocket wheel 157' connects with the sprocket wheel 56$^a$, by drive chain 158 shown in dotted lines in Fig. 2, and by solid lines in Fig. 1.

Figure 33:
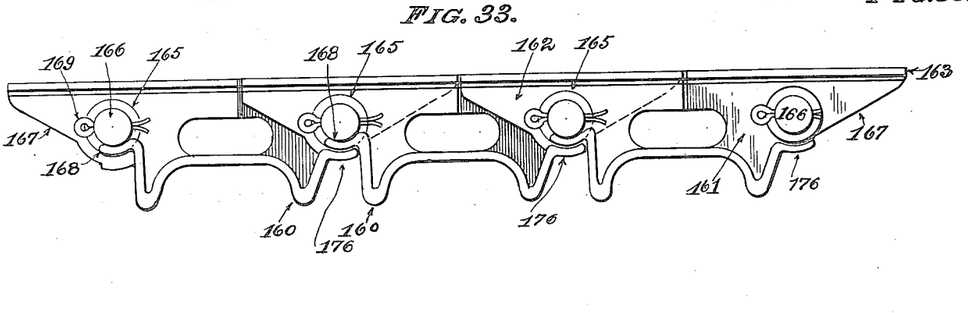
Fig. 33 is a side-elevation of a portion of the endless track-band employed in this machine.
Figure 34:
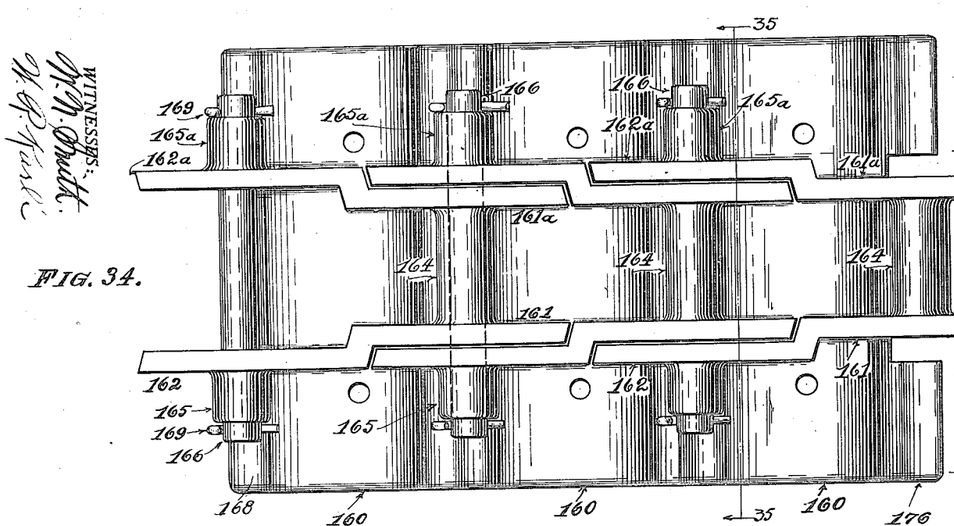
Fig. 34 is a plan of the same.
Figure 35:
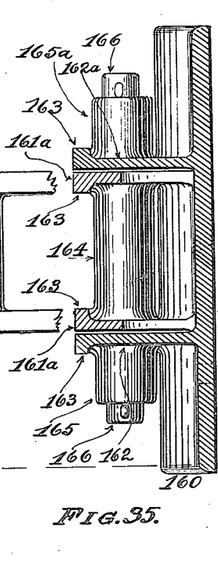
Fig. 35 is a sectional view of the same on line 35—35 of Fig. 34.
Figure 36:
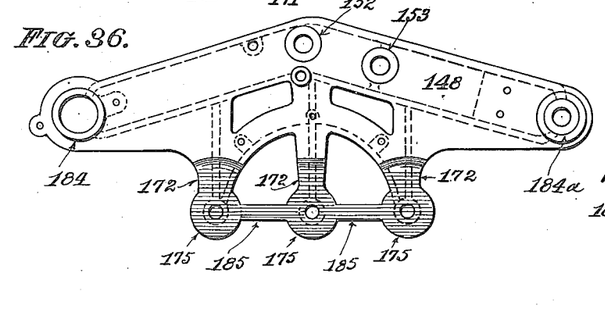
Fig. 36 is a side-elevation of a cast-member forming the main part of the truck-frame.

Trained over sprocket wheel 151 and idler wheel 150 there is an endless track-band 159, comprising a series of articulated shoes as illustrated in detail in Figs. 33, 34, and 35. Each of these shoes consists of a corrugated plate 160 of proper width and thickness to resist bending under usual strain. At both sides of the center line of these shoes there rise two walls, 161, 161$^a$, which for some distance are in parallel relation, and then offset, as shown at 162, 162$^a$, thereby forming, as it were, links for an endless chain, the narrower portions between these walls entering the space between the wider portions thereof, the upper edges of these walls forming a continuous track whereupon carrying-rollers hereinafter to be referred to, are constructed to move. Each of these walls 161, 162, and 161$^a$, 162$^a$, have at their upper margins outwardly-extending ribs, 163, to stiffen these walls and also to form a wider track-surface than what these walls would afford. The walls 161, 161$^a$, are connected to each other by a tubular boss, 164; and the walls 162, 162$^a$, have laterally extending tubular bosses, 165, 165$^a$, which latter bosses aline with the bosses 164 when the shoes are assembled; a pin or pintle 166, being passed through these bosses whereby the several shoes are hingedly connected one to the other. Portions of the walls extend in front and in the rear of the pintles for some distance so as to avoid locating the joints of the plates directly over the center of said pintles, which I consider of importance since this construction affords long overlaps of the links and prevents sidewise swaying of the track-band. The ends 167 of the side walls of each plate are tapered, as illustrated in Fig. 33, to reduce weight without impairing efficiency of the design. The transverse margins of each plate are curved to a radius having its center in the center of the pin or pintle, one margin 168 being close to the pintle while the margin 176 at the end of the plate overlaps the curved margin 168, whereby open joints in the adjacent plate margins are avoided, and thereby the entrance of grit, dirt, and other foreign matter to the plate-joints is prevented.

Since lubrication of the moving parts of the endless trackband is of but little if any avail owing to the peculiar condition of use of this machine, I form the plates 160 with their track-sections integrally in the process of casting and employ for the material a superior grade of manganese steel which combines to the greatest extent hardness with tensile strength. I also make the pintles of the same material, and since a very close fit is not at all required or a desideratum, these parts can be produced entirely in the process of casting without any other machining than what can be readily accomplished by grinding. Parts produced in this manner will wear extremely well without lubrication of any kind. And since the cutting of threads at the ends of the pintles for the application of nuts to keep the pintles in position is not feasible, I cast holes near the ends of the pintles through which cotter-pins 169, are passed and thereby the pintles retained in place, while their removal in case of breakage is but a simple matter.

Referring to Figs. 1, and Figs. 36 to 40 inclusive, there is located in front of the truck frame 148 an arcuate frame 170, having a series of bearings 171, in alinement with similar bearings 175 on the ends of the downwardly extending members 172 of the truck-frame 148. These bearings receive shafts 183, Fig. 38, on which are mounted bearing rollers 173, which travel on the margins 163 of the endless track-bands and thus sustain the superposed weight of the machine.

In order to strengthen the triangular main truck frame and the arcuate frame member, these parts are amply provided with ribs, as shown, and the bearings 175 on said main frame are connected by bars 185, while the bearings 171 on the arcuate frame member are connected by bars 186, said bars 185, 186, being integrally formed with their respective bearings, and the remaining portions of said truck-frame members.

The operation of this machine as far as not already described, is as follows: The motor A having started, the hand lever 131ᵃ on the rear platform is pushed forwardly to cause the friction clutch 113 to engage the fly-wheel 107 and thereby cause rotation or movement of the endless track-band through the medium of the transmission gearing already described. In the gear case 26, 26ᵃ, are located the transmission gear-wheels 29, 29ᵃ, either of which can be engaged to rotate the transverse shaft 31 in forward or backward direction by shifting the clutch-member 49, Fig. 20, to the right or the left. This movement is accomplished by operating the hand lever 106 at the rear end of the machine, which hand lever connects to the lever 55, by a rod 174.

One of the important objects of this invention is the construction of a tractor in which the steering is accomplished by the joint action of moving the steering wheels and retarding the speed of movement of one of the endless track-bands. This result is attained by my present invention wherein, by rotating the hand-wheel in one direction from normal position the two steering wheels in front of the machine are moved accordingly by the segmental gear wheel causing a rotative movement of the yoke in which the steering wheels are journaled. As soon as this segmental gear wheel changes its normal position shown in Fig. 2, one or the other of the friction rollers 96, 96ᵃ, will strike the end of the corresponding bell-crank 100, 100ᵃ, and moving the same, act on the proper friction clutch on the transverse shaft 31, to diminish the frictional contact on the driven disk and thereby reducing the speed of that endless track-band that is governed by said friction clutch. Thus turning the steering wheels toward the left to cause the machine to turn toward the left, the bell-crank lever 100 is caused to move rearwardly and since this lever controls the endless track-band at the left of the machine the movement of this track-band will be retarded whereby the track-band at the right of the machine having thus the preponderance of speed, will assist in the turning of the machine. The tension or frictional contact of these friction drives is preferably so adjusted that when the steering wheels assume a position almost at right angles to the longitudinal center line of the machine, the corresponding friction clutch will be entirely disengaged and the machine caused to turn upon the traction band whose forward movement has been completely arrested by the disengagement of its controlling friction clutch. The curved portions 182 of the bell-cranks are so designed that there will be but a perceptible movement imparted to said bell-cranks as the segmental gear wheel is being turned, the curvature being so timed that it will require nearly one-fourth of a complete rotation of said segmental gear wheel to completely disengage the corresponding friction clutch.

In connection with this description of the construction and operation of the friction clutch mechanism that controls the movement of the endless track-bands, I here wish to state, that the adjustment of these friction clutches is such that they will transmit slightly less than the maximum energy of the motor to the endless track-bands. It therefore follows that should one, or the other, or both, of these endless track-bands meet an obstruction which is sufficient to arrest the movement of the tractor, or in other words stall the machine, curved plates 66 on the pivoted levers 63, will slip on the periphery or peripheries of the driven disks 57, 57ᵃ, of said friction clutches without stopping the motor. This is another important feature of my invention which avoids the frequent re-starting of the motor, which would be necessary, were the friction clutches so adjusted that they would be capable of transmitting more than the maximum power of the motor, and the motor be stalled when the tractor meets an obstruction which it cannot surmount.

A machine of the nature described is always more or less subjected to strain owing to the uneven ground over which it is mostly moved. This requires a certain degree of flexibility in the chassis; but since such twisting of the frame structure of this machine is liable to interfere with the transmission gearing, I suspend the same by its bearings 32, 32ª, in a peculiar manner. The central portions of these bearings are somewhat ball-shaped as clearly illustrated in Fig. 4, and these bearings are engaged by pillow blocks 177, 177ª, shown in detail in Figs. 21, 22, and 23. These pillow blocks comprise each a base body having a lateral flange 178, by which, and bolts 179, it is secured upon the upper surface of the chassis, one on each side of the same, and a cap 180, the semicircular openings 181, in the base and the cap having a curvature corresponding to the curvature of the gear case-bearing 32, thereby permitting of a slight rocking movement of said casing which will save same from being strained.

Figures 41, 42:
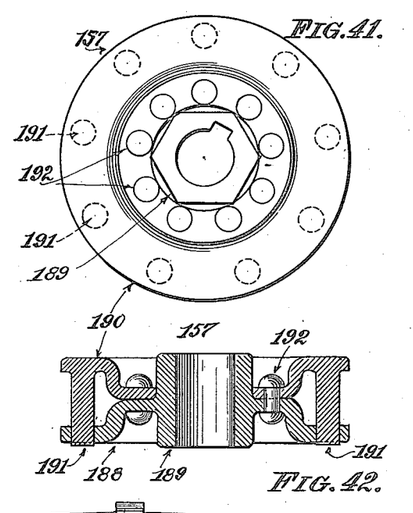
Fig. 41 is a plan of the lantern-pinion detached.
Fig. 42 is a sectional view of the same.

I have heretofore referred to the lantern pinion 187 which rotates the sprocket wheel 151. This lantern pinion which is detailed in Figs. 41 and 42, comprises a main portion 188 having a bored and key seated hub 189 and a companion portion 190, being an annular ring placed over the hub 189. This member 190 has extending from its flank a series of concentrically arranged cylindrical pins 191, which are integrally formed with said part 190 and constructed to enter with their free extremities holes in the member 188. These pins constitute the cogs of a gear pinion which cogs engage the sprocket teeth of the sprocket wheel 151 in an obvious manner. The two parts of this lantern pinion are securely held together, by suitable means, preferably by rivets 192, so that should one or the other of these pins be broken the member 190 can be readily removed and replaced by a new part.

The members 188 and 190 are formed in the process of casting in manganese steel which renders them exceedingly strong and durable and yet comparatively cheap of production. The objects of employing a lantern pinion in preference to a gear-pinion are first, that this pinion has less than 12 teeth, and it is a well recognized fact that gear wheels having less than twelve teeth do not operate successfully, and for the further reason that grit, dirt and other foreign matter that may be carried to the pinion, will be readily pushed out of the same by the teeth of the sprocket wheel 151.

Figures 37, 39, 40:
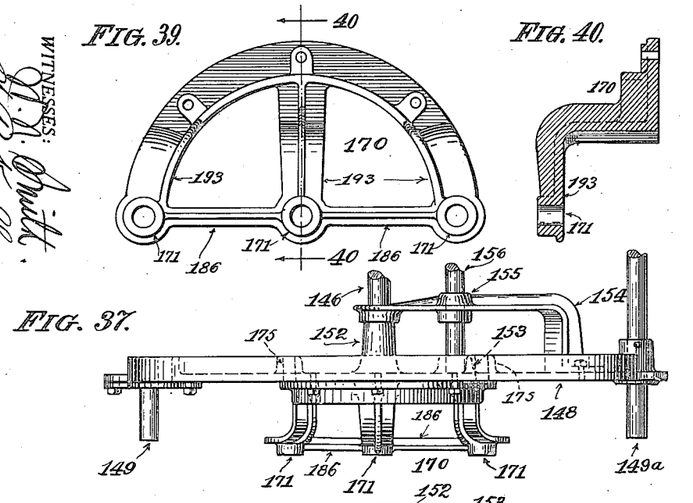
Fig. 37 is a plan of the same with its brackets attached.
Fig. 39 is a front elevation of the front-bracket of the truck-frame.
Fig. 40 is a sectional elevation on line 40—40 of Fig. 39.
Figure 38:
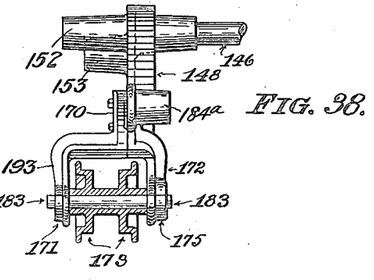
Fig. 38 is an end-elevation of the same, the rear bracket not being shown, and one of the bearing wheels being shown in section.

As shown in Fig. 38, the main portion of the truck-frame, has the lower portions of its pending members 172 rearwardly offset, while the coacting portions 193, Figs. 38 and 39, of the arcuate member 170 are forwardly offset, the spaces between these offset portions being occupied by the bearing-wheels 173, the treads whereof are spaced to correspond to the tracks of the endless track-bands. The upper runs of these track-bands are supported by rollers 194, as shown in Fig. 1.

I have heretofore described this machine with reference to endless track bands as the means for propelling the tractor, but it is evident that the manually operated mechanism for governing the direction of movement of the steering wheels is also well adapted to automatically retard the movement of one or the other of a pair of traction mechanisms other than endless track bands and I desire it to be understood that my invention as described can be readily applied to most all of the various types of self-propelled vehicles.

I also desire to call attention to the fact that while I have shown and described a pair of steering wheels journaled in a yoke constructed to receive the same, I may discard one of these steering wheels if desired and that, while I have, in the present instance located the steering wheels in the front, and the traction means in the rear of the tractor, I may reverse the order of arrangement of these parts, and as a matter of fact, when the machine is being backed up, this state of affairs actually exists.

While I have heretofore described the preferred embodiment of my invention and have with considerable minuteness described the various parts and mechanisms entering in the construction thereof, I desire it to be understood that many of these details may be changed without departing from the scope of my invention as particularly ascertained in the subjoined claims.

I also desire to state that several of the mechanisms shown in the drawings, and described in the foregoing specification, are forming the subject matters of separate applications for patents, which are divisions of this present application, and which divisional applications are being prepared and will be filed as soon as the same are ready for lodging.

Having thus fully described this invention, I claim as new and desire to secure by Letters Patent of the United States—

1. A traction engine, including a chassis, a motor mounted on said chassis, traction means on each side of said chassis, friction driven mechanism connected to said motor constructed to operate said traction means independently of each other, one or more steering wheels, manually operated means connected to said steering wheels, for guiding the same, and automatically operating means connected to the steering wheel mechanism, constructed to operate upon one or the other of said friction driven mechanisms differentially in such manner that the ratio of release of one of said friction driven mechanisms shall be proportionate to the divergence of said steering wheels from a straight course of movement of the traction engine.

2. In a traction engine, a chassis, a motor mounted on said chassis, one or more steering wheels, a pair of traction means located one on each side of the machine and constructed to move the tractor, manually-actuated mechanism constructed to govern the direction of movement of said steering wheels, and mechanism connected with said manually-actuated mechanism constructed to automatically release or disconnect one of said traction means from said motor without influencing the other of said traction means, the aforesaid release being a differential one, the ratio of release being proportionate to the divergence of said steering wheels from a straight course.

3. In a traction engine, a chassis, a motor mounted on said chassis, one or more steering wheels, a pair of endless track-bands on which the engine is constructed to move, friction driven mechanism constructed to operate said endless track-bands independently of each other, manually-actuated mechanism constructed to direct the movement of said steering wheels, and mechanism connected with said manually-actuated mechanism constructed to automatically release or disconnect one of said endless track bands, the aforesaid release being a differential one, a total disconnection not taking place until the steering wheels have approximately reached their limit of divergence from a straight course.

4. In a traction engine, a chassis, a motor mounted on said chassis, one or more steering wheels, a pair of endless track bands on which the tractor is constructed to move, a separate, friction-driven connection between said motor and each of said track-bands, manually actuated mechanism constructed to govern the movement of said steering wheels, and mechanism connected with said manually actuated mechanism constructed to automatically release or disconnect one of said endless track bands, independently of the other endless track-band, the mechanism for releasing said endless track-bands including cam-shaped levers connecting the steering mechanism to the friction driving mechanism to afford a differential release of the friction driven mechanism, coincident with the divergence of the steering wheels from a straight course, without causing a total disconnection of said traction bands from said motor.

5. In a traction engine having endless track-bands on which the tractor is constructed to move, one or more steering wheels and a pair of endless track-bands, one at each side of the machine, a motor on said tractor, gearing constructed to connect said motor to each of said endless track-bands, said gearing including a friction clutch mechanism for each endless track-band, manually operated mechanism constructed to govern the direction of movement of said steering wheels and mechanism connected with said steering wheels and each of said friction clutches constructed to release or disconnect one of said traction bands from said motor without interfering with the movement of the other of said traction bands, the release of said traction band being proportionate to the divergence of said steering wheels from a straight course, the total disconnection not taking place until the said steering wheels have approached the limit of their divergence.

6. In a traction engine having endless track-bands, means for manually steering the machine and automatically retarding the movement of one of said track-bands, said means including one or more steering wheels, a fork in which said steering wheels are journaled, said fork being centrally pivoted, means on said fork constructed to oscillate said fork on its pivot, means for manually oscillating said fork, a motor and friction drive transmission gearing on said machine, constructed to operate the endless track-bands, two endless track-bands on which said machine is constructed to move, and mechanism connected to said fork-manipulating mechanism and to each of said endless track-bands constructed to release or disconnect one or the other of said endless track-bands from said motor when said steering wheels are turned from their normal position, the release of said track-bands being proportionate to the divergence of said steering wheels from their normal position.

7. In a traction engine having endless track-bands on which the tractor is constructed to move, one or more steering wheels, a fork in which said steering wheels are constructed to rotate, a vertical pivot on which said fork is constructed to oscillate, a segmental gear wheel connected to said vertical pivot, a pinion constructed to engage said gear wheel, manually-operated mechanism constructed to rotate said pinion, pivots on said gear wheel at substantially diametrically opposed points, a motor on said tractor, transmission gearing on said tractor connected to said motor, independently operating mechanism connecting said transmission gearing to each of said endless track-bands, bell-crank mechanism connected to said independently operating mechanism, said bell-crank mechanism being actuated by said segmental gear wheel and constructed to govern one or the other of said bell-crank mechanisms.

8. In a traction engine, the combination of a chassis, a motor on said chassis, transmission gearing connected to said motor, said transmission gearing including a transverse driving shaft, a friction clutch mechanism at each end of said driving shaft, a traction means at each side of said chassis, mechanism constructed to connect one of said friction mechanisms to one, and the other, to the other of said traction means, one or more steering wheels, manually operated mechanism connected to said steering wheels constructed to govern the direction of movement of said steering wheels, said latter mechanism including a gear wheel and a pinion engaging said gear wheel, studs at substantially opposed points on said gear wheel, a pair of levers, each connected at one end to one of said friction clutches, and at the opposite end in engagement with one of said studs, the latter ends of said bell-crank levers being cam-shaped and affording a differential release of the said friction clutch mechanism proportionate to the divergence of the steering wheel or wheels, the total release of said friction driven transmission gearing not taking effect until said steering wheels approach their limit of divergence.

9. In a traction engine, the combination of a chassis, a motor on said chassis, transmission gearing connected to said motor, said transmission gearing including a transverse driving shaft, a friction clutch mechanism at each end of said driving shaft, a traction means at each side of said chassis, mechanism constructed to connect one of said friction mechanisms to one, and the other, to the other of said traction means, one or more steering wheels, manually operated mechanism connected to said steering wheels constructed to govern the direction of movement of said steering wheels, said latter mechanism including a gear wheel and a pinion engaging said gear wheel, studs at substantially opposed points on said gear wheel, a pair of levers, each connected at one end to one of said friction clutches, and at the opposite end in engagement with one of said studs, the latter ends of said levers being cam-shaped and constructed to cause a differential movement of said levers with respect to the movement of said studs.

10. In a traction engine the combination of a chassis, a motor on said chassis, transmission gearing connected to said motor including a transverse driving shaft, a bracket extending from the forward end of said chassis, a fork having a pivot in said bracket, one or more steering wheels journaled in said fork, a segmental gear wheel on said pivot, a pinion constructed to engage said segmental gear wheel, manually operated mechanism connected to said pinion to rotate same in either right or left direction, studs on said segmental gear wheel at diametrically opposite points, a frame structure projecting laterally from said chassis, pivots at the terminals of said frame structure, bell-cranks connected to said pivots, one end of each of said bell-cranks being in engagement with one of said studs, and clutch mechanism at each end of said transverse shaft, the other ends of said bell-cranks being connected to said clutch mechanisms, as described.

11. In a traction engine, a chassis, a motor on said chassis, and transmission gearing connected with said motor, said transmission gearing including a gear case, bearings on said gear case, a transverse shaft passing through said gear case and extending beyond both sides of said chassis, said gear case being oscillatably connected to said chassis, two, oppositely facing bevel wheels in said gear case and rotatably mounted on said transverse shaft, one of said bevel gear wheels having two circles of gear teeth, a shaft longitudinally disposed in said gear case, a bevel pinion at the inner end of said longitudinal shaft constructed to engage the inner circle of cogs on one of said bevel wheels a tubular casing in which said latter shaft is constructed to rotate, said tubular casing having at its inner end a bevel pinion constructed to engage the outer circles of both of said bevel wheels, a shaft connected to said motor and terminating in said tubular casing, means in said tubular casing constructed to either engage said tubular casing or the bevel pinion shaft by laterally moving said motor-connected shaft, and clutch mechanism on said transverse shaft between said bevel wheels constructed to connect said transverse shaft to either one of said bevel wheels.

In testimony that I claim the foregoing as my invention I have hereunto set my hand, in the presence of two subscribing witnesses.

ORLEY C. HOUGHTON.

Witnesses:
 MICHAEL J. STARK,
 J. H. GRUBER.